US005856787A

United States Patent [19]

Ikka

[11] Patent Number: 5,856,787

[45] Date of Patent: Jan. 5, 1999

[54] RADIO PAGER

[75] Inventor: Masahiro Ikka, Sahizuoka, Japan

[73] Assignee: NEC Corporation, Tokyo, Japan

[21] Appl. No.: 670,066

[22] Filed: Jun. 25, 1996

[30] Foreign Application Priority Data

Jun. 29, 1995 [JP] Japan .................................... 7-163214

[51] Int. Cl.[6] .................................................. H04Q 7/18

[52] U.S. Cl. .................................. 340/825.44; 340/311.1; 455/38.1; 370/313

[58] Field of Search ......................... 340/825.44, 825.47, 340/825.52, 825.69, 825.48, 311.1; 455/426, 31.2, 38.1, 31.1, 38.2; 370/310, 313, 314

[56] References Cited

U.S. PATENT DOCUMENTS

| | | | |
|---|---|---|---|
| 5,025,252 | 6/1991 | Deluca et al. | 340/825.44 |
| 5,185,604 | 2/1993 | Nepple et al. | 340/825.44 |
| 5,225,826 | 7/1993 | Deluca et al. | 340/825.44 |
| 5,374,925 | 12/1994 | Ohkuma | 340/825.44 |
| 5,381,138 | 1/1995 | Stair et al. | 340/825.44 |
| 5,418,529 | 5/1995 | De Luigi et al. | 340/825.44 |
| 5,572,197 | 11/1996 | Matsumoto | 340/825.44 |

FOREIGN PATENT DOCUMENTS

| | | |
|---|---|---|
| 5244064 | 9/1993 | Japan . |
| 6291715 | 10/1994 | Japan . |
| 2168516 | 6/1986 | United Kingdom . |

*Primary Examiner*—Brian Zimmerman
*Assistant Examiner*—William H. Wilson, Jr.
*Attorney, Agent, or Firm*—Sughrue, Mion, Zinn, Macpeak & Seas, PLLC

[57] ABSTRACT

When a radio selective calling receiver receives a special code commanding the deletion of a received message, it deletes a message designated by a control signal following the special code.

8 Claims, 10 Drawing Sheets

FIG. 1
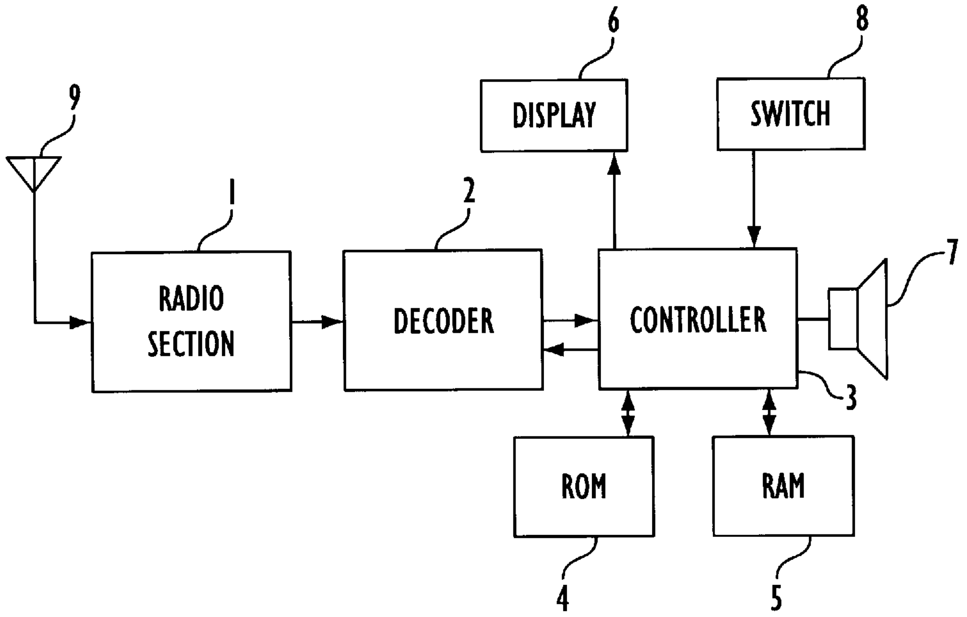
FIG. 2(a)
FIG. 2(b)
FIG. 2(c)
FIG. 2(d)
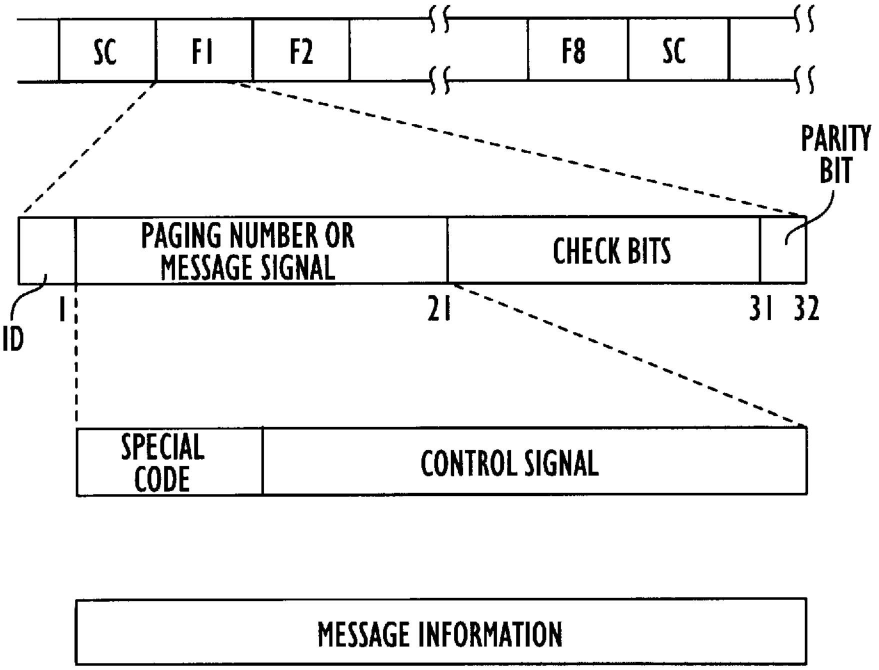

RADIO PAGER

BACKGROUND OF THE INVENTION

1. Field of the Invention

The present invention relates to a radio selective calling receiver and, more particularly, to a radio selective calling receiver capable of controlling a message stored therein.

2. Description of the Related Art

Generally, when a message is sent from a caller or transmitter via a telephone circuit, a radio selective calling receiver, such as a pager, stores the message. The user of the pager reads the stored message and determined whether or not it should be stored. The user may store the message in the pager if it is important and will be needed later, or may delete the message if it is not necessary by operating a key button provided on the pager.

When the pager receives a message while the user is attending at, e.g., a conference, the user may not read it out.

The problem with this type of pager is that when the caller sends an incorrect message by accident and notices it later, the caller cannot delete the message received by the pager. To inform the user of the pager of the transmission of the incorrect message, the caller must again send a correct message or a particular message for correction. As a result, two different messages are written to a storage built in the pager.

On the other hand, the storage of the pager has only a limited capacity. Therefore, when the incorrect message and the message for correction are wastefully written to the storage, it is likely that other received messages cannot be stored in the storage.

SUMMARY OF THE INVENTION

It is therefore an object of the present invention to provide a radio selective calling receiver which allows a caller to control a message stored in the selective calling receiver.

A radio selective calling receiver of the present invention has a receiving section for receiving a paging signal sent from a caller. A storage stores a message included in the paging signal. A controller deletes, when a special code commanding message deletion is included in the paging signal, a message stored in the storage and corresponding to a message designated by a control signal following the special code.

The controller includes a decision section for determining whether or not a plurality of messages to be deleted exist, and an alarm information adding section for discontinuing, when a plurality of messages to be deleted exist, the message deletion and adding alarm information representative of receipt of a deletion command to the messages.

The controller may further include a setting section for setting whether or not to execute message deletion beforehand. The alarm information adding section may add the alarm information when the setting section is so set as not to allow deletion to be executed.

The storage stores a time of receipt at which the receiving section receives the paging signal. The control signal designates the time of receipt. A searching section searches messages received at and around said time of receipt in order to detect a message to be deleted.

The storage may store a message number included in the paging signal, and the control signal may designate a message to be deleted on the basis of the message number.

With the above configuration, the radio pager allows the caller himself to delete an incorrect message sent by accident. The setting section informs the user of the pager of the receipt of the deletion command without causing the deletion to be executed.

BRIEF DESCRIPTION OF THE DRAWINGS

The above and other objects, features and advantages of the present invention will become apparent from the following detailed description taken with the accompanying drawings in which:

FIG. 1 is a schematic block diagram showing a radio selective calling receiver embodying the present invention;

FIGS. 2(*a*) through 2(*d*) show a specific format of a paging signal applicable to the embodiment;

DESCRIPTION OF THE PREFERRED EMBODIMENT

Figure 3:
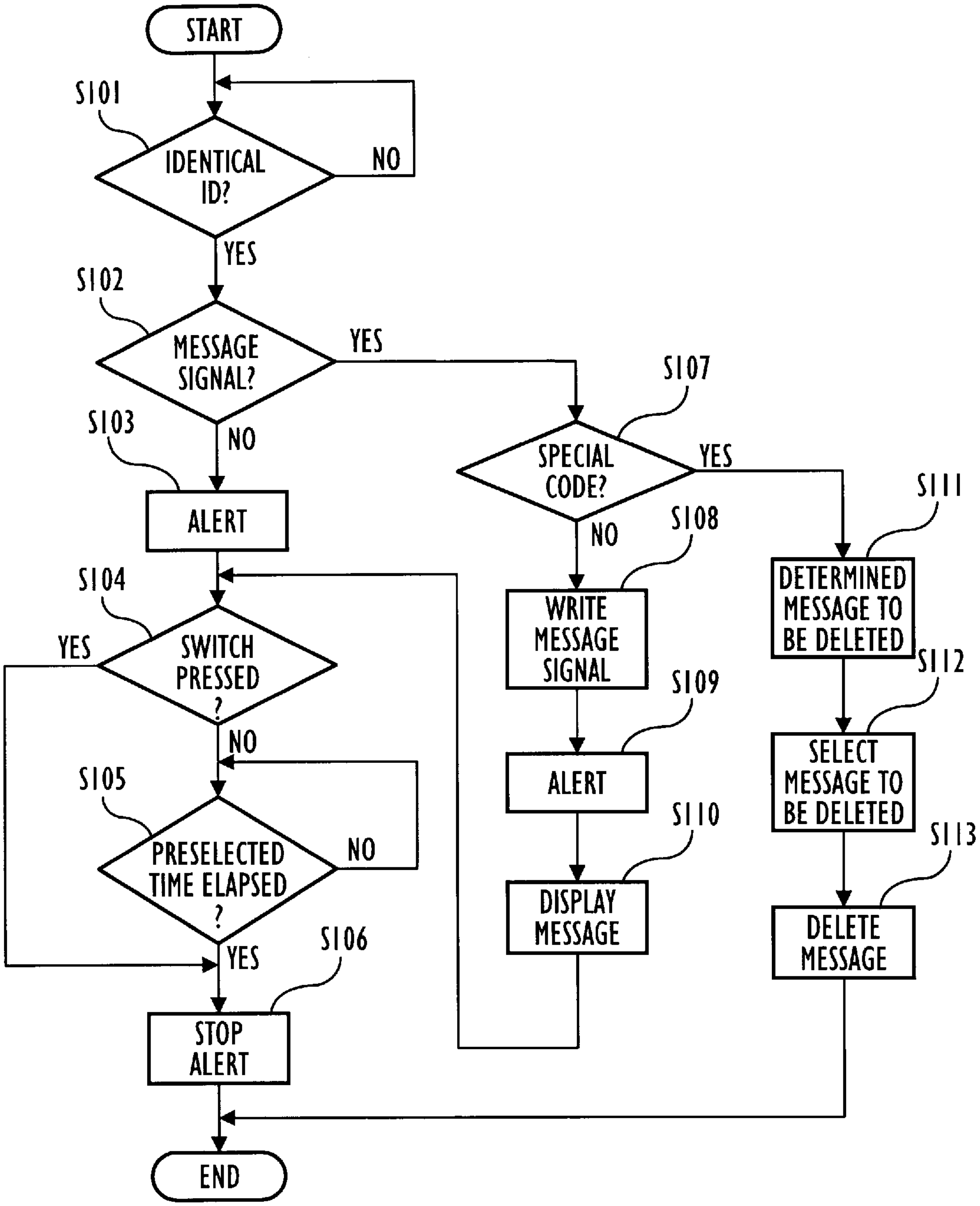
FIG. 3 is a flowchart outlining a specific operation of the embodiment.

Referring to FIG. 1 of the drawings, a radio selective calling receiver, e.g., a pager, embodying the present invention is shown. As shown, the pager has a radio section 1, a decoder 2, a controller 3, a ROM (Read Only Memory) 4, a RAM (Random Access Memory) 5, a display 6, a speaker 7, a switch 8, and an antenna 9.

First, the receiving and alerting operation of the above pager will be outlined. A paging signal received by the antenna 9 is demodulated by the radio section 1. The demodulated signal output from the radio section 1 is input to the decoder 2. The decoder 2 compares an address number (ID) included in the demodulated signal with an address number assigned to the pager and fed from the ROM 4 via the controller 3. If the two address numbers compare equal, the decoder 2 delivers a message signal following the ID to the controller 3; if otherwise, it does not receive the signal following the ID.

The controller 3 writes the message signal in the RAM 5, displays the received message on the display 6, and drives the speaker 7 for alerting the user of the pager to the receipt. The ROM 4 stores various kinds of control signals in addition to the address number assigned to the pager.

In accordance with the present invention, the ROM 4 stores a preselected special code to allow the caller or transmitter to delete the message written to the RAM 5. If the controller 3 detects a signal identical with the particular code out of the received message signal, then it deletes the message stored in the RAM 5. The RAM 5 is used to temporarily store set information relating to various kinds of functions.

FIGS. 2(*a*) through 2(*d*) show the format of a POCSAG signal which is one of conventional paging signals. As shown in FIG. 2(*a*), the paging signal is made up of a synchronizing code SC and a plurality of frames F1 through F8 each consisting of two code words. As shown in FIG. 2(*b*), each code word has thirty-two bits, i.e., one identification (ID) bit, twenty data bits, ten check bits, and one parity bit. The ID bit is used to determine whether data following it is an address number or whether the data is a message signal. For example, the ID bit indicates that data following it is an address number if it is (logical) ZERO, or indicates that the data is a message signal if it is (logical) ONE.

FIGS. 2(*c*) and 2(*d*) each shows a signal format to appear when the data signal is a message signal. In FIG. 2(*c*), the message signal includes a special code for deleting the stored message and a control signal. The special code is used for the pager to start a message delete mode while the control signal indicates a message to be deleted. In FIG. 2(*d*), the data signal is entirely implemented as message information.

The operation of the illustrative embodiment will be outlined with reference to FIG. 3. As shown, whether or not the address number (ID) included in the paging signal is identical with the address number stored in the ROM 4 is determined (step S101). If the answer of the step S101 is positive (YES), whether or not the code word following the ID is a message signal is determined (step S102). If the answer of the step S102 is negative (NO), the controller 3 drives the speaker 7 in order to alert the user to the receipt (step S103). When the user operates the switch 8 (step S104) or when a preselected period of time T elapses (step S105), the controller 3 stops driving the speaker 7, i.e., stops producing the alert (step S106).

If the code word following the ID is a message signal (YES, step S102), whether or not the leading portion of the message signal is identical with the special code stored in the ROM 4 is determined (step S107). If the answer of the step S107 is NO, the controller 3 writes the message signal in the RAM 5 (step S108), starts alerting the user to the receipt (step S109), and displays the message on the display 6 (step S110). Subsequently, the controller 3 stops the alert and display on detecting the operation of the switch 8 or the elapse of the preselected period of time.

On the other hand, when the leading portion of the message signal is identical with the special code (YES, step S107), a message to be deleted is determined on the basis of the control signal or message signal following the special code (step S111). Among the messages stored in the RAM, the message corresponding to the determined message is selected (step S112) and then deleted (step S113).

The steps S111 through S113 will be described in detail with reference to FIGS. 4 through 11.

Figure 4:
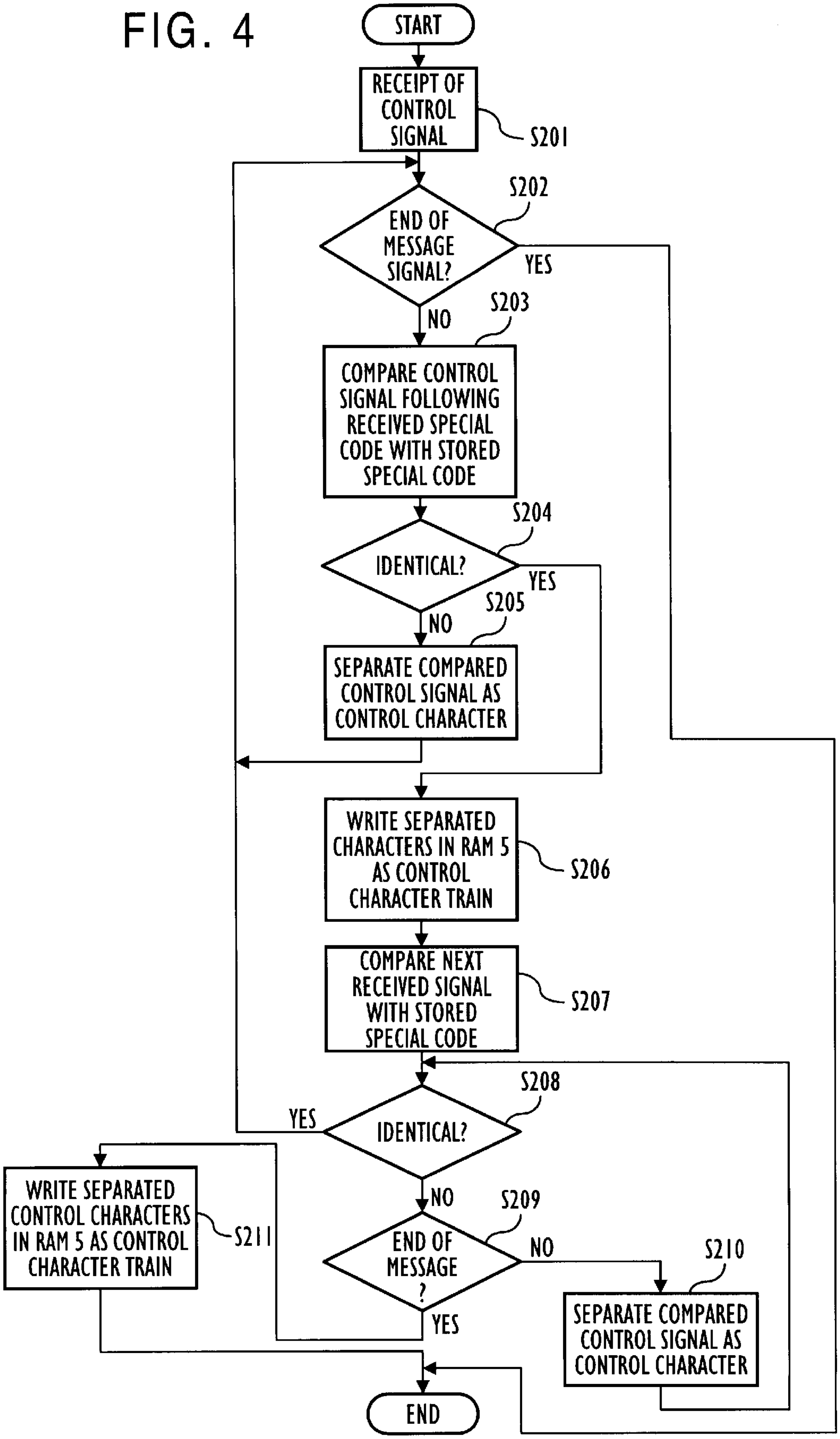
FIG. 4 is a flowchart demonstrating how the embodiment determines a message to be deleted.

FIG. 4 shows the step S111 of FIG. 3 in detail. As shown, when the special code indicative of the deletion of a message is detected, the control signal following it is received (step S201). If the receipt of the message signal does not end (NO, step S202), whether or not the control signal or message signal following the received special code is identical with the stored special code is determined again (step S203). If the control signal is not identical with the special code (NO, step S204), then it is separated from the received signal as a control character, that is, all the characters following the special code are determined to constitute a control character train for deleting a message. This processing is continuously executed until the message signal ends.

When the received signal is again determined to be identical with the stored special code (YES, step S204), the control signal between the first and the second special codes is a control character train. The separated control characters are arranged in a control character train and then written to the RAM 5 (step S206). Subsequently, the next received signal is compared with the stored received code (step S207). If the received signal is not identical with the stored code (NO, step S208), and if the message signal does not end (NO, step S209), the compared signal is separated as a character code (step S210). If the message signal ends (YES, step S209), the separated characters are arranged in a control character train and then written to the RAM 5 (step S211). On the other hand, if the answer of the step S208 is YES, the program returns to the step S202.

As stated above, the procedure for detecting the control code following the particular code is executed.

The step S112 shown in FIG. 3 will be described in detail with reference to FIGS. 5 and 6. For the deletion of a message, there are available, e.g., four different kinds of methods, i.e., one designating message characters, one designating a message number, one designating an absolute time, and one designating a relative time. Specifically, a message character command is indicative of a message to be deleted itself while a message number command is representative of a number assigned to a message to be deleted. An absolute time command is representative of a time at which a message has been received while a relative time command is representative of an interval between the receipt time of a message to be deleted and the current time.

When a particular special code is assigned to each of the deletion commanding methods, the kind of deletion is determined for the selection of a message to be deleted, as will be described with reference to FIG. 5. In this case, the four kinds of commanding methods can be implemented if two bits are allocated to the special code.

Figure 5:
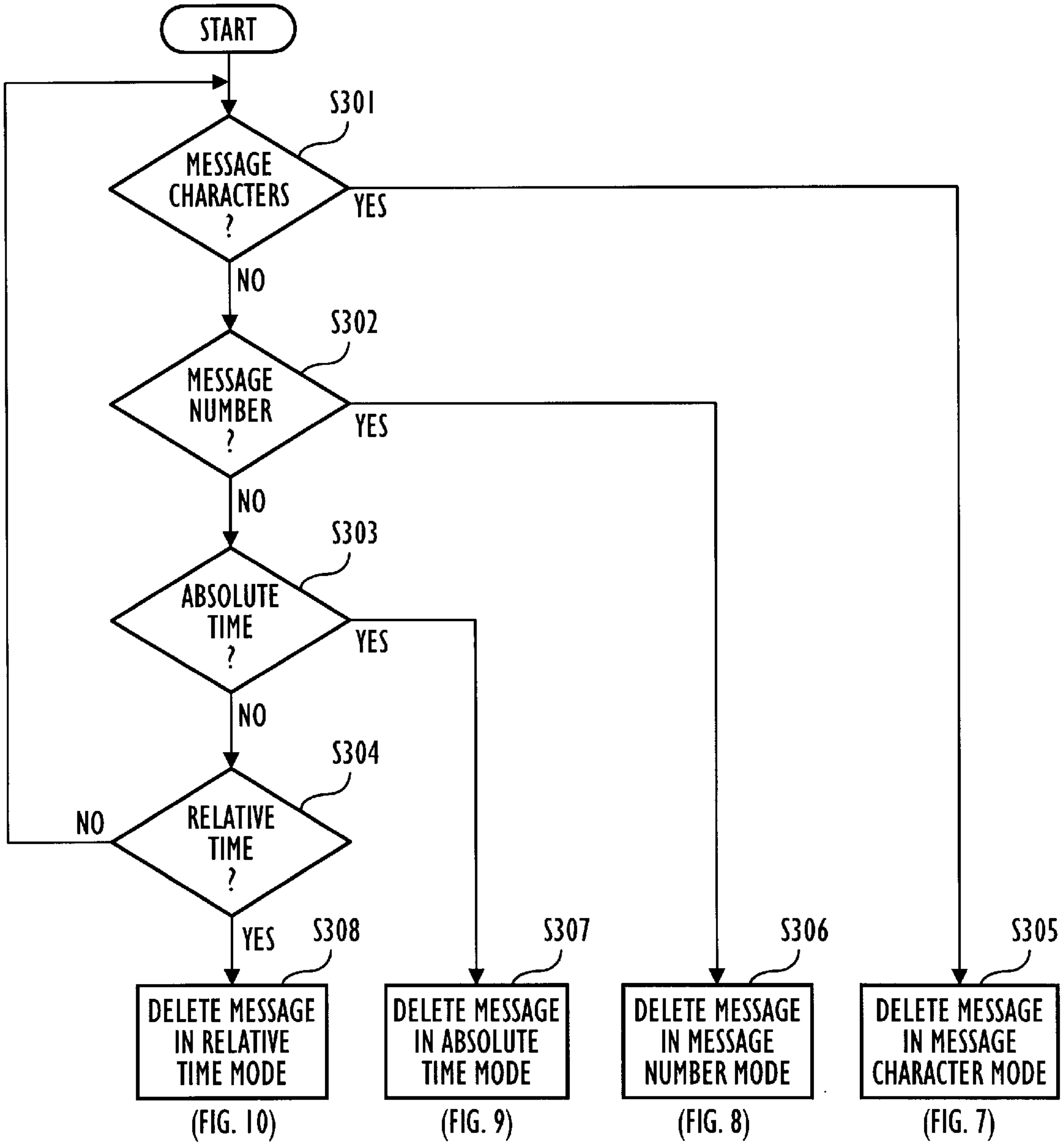
FIG. 5 is a flowchart representative of a procedure for determining, when a particular special code is assigned to each of different deletion commanding methods, which method should be used for the selection of the message to be deleted.

In FIG. 5, the kind of deletion commanded by the special code is determined. For example, whether or not the special code is representative of the message character command is determined first (step S301). If the answer of the step S301 is YES, the program starts message deletion processing based on message characters (step S305) (message character mode). If the answer of the step S301 is NO, whether or not the special code is representative of the message number command is determined (step S302). If the answer of the step S302 is YES, the program starts message deletion processing based on the message number (step S306) (message number mode). If the answer of the step S302 is NO, whether or not the special code is representative of the absolute time command is determined (step S303). If the answer of the step S303 is YES, the program starts message deletion processing based on the absolute time (step S307) (absolute time mode). If the answer of the step S303 is NO, whether or not the special code is representative of the relative time command is determined (step S304). If the answer of the step S304 is YES, the program starts message deletion processing based on the relative time (step S308) (relative time mode). If the answer of the step S304 is NO, the program returns to the step S301.

Of course, the above order of decision as to the kind of deletion is only illustrative and may be changed, as desired.

Figure 6:
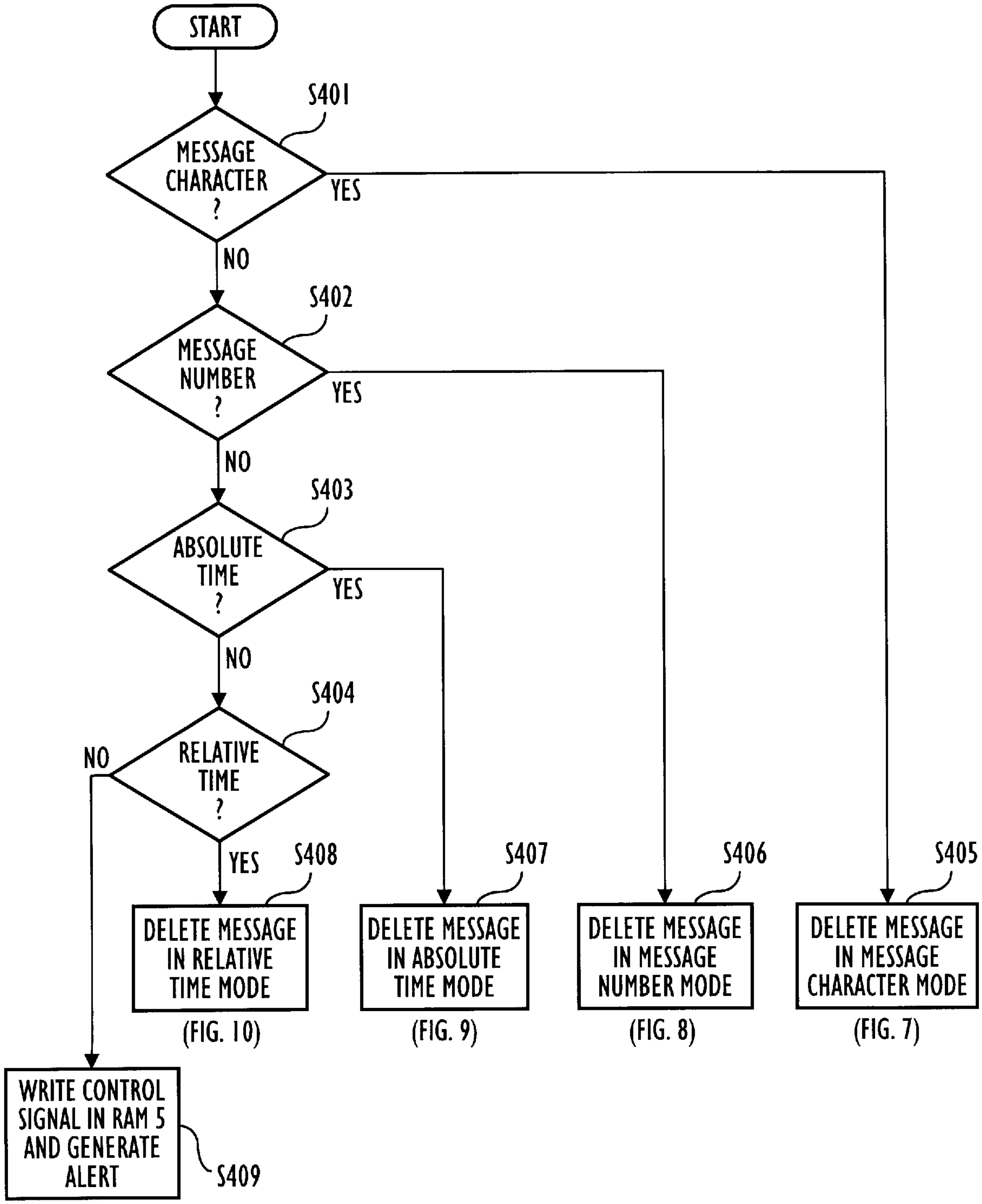
FIG. 6 is a flowchart showing a procedure in which the deletion commanding method is selected on the basis of a kind-of-deletion code included in a control signal.

FIG. 6 demonstrates an alternative operation in which the special code is indicative of deletion and implemented as a kind-of-deletion code included in the control signal. In this case, only a single kind of special code suffices because the kind of deletion is determined on the basis of the kind-of-deletion code. The position of the kind-of-deletion code in the control signal is determined before-hand.

In FIG. 6, the kind of deletion indicated by the kind-of-deletion code is determined. For example, whether or not the kind-of-deletion code is representative of the message character command is determined first (step S401).

If the answer of the step S401 is YES, the program starts the message deletion processing based on message characters (step S405). If the answer of the step S401 is NO, whether or not the code is representative of the message number command is determined (step S402). If the answer of the step S402 is YES, the program starts message deletion processing based on the message number (step S406). If the answer of the step S402 is NO, whether or not the code is representative of the absolute time command is determined (step S403). If the answer of the step S403 is YES, the program starts message deletion processing based on the absolute time (step S407). If the answer of the step S403 is NO, whether or not the code is representative of the relative time command is determined (step S404). If the answer of the step S404 is YES, the program starts message deletion processing based on the relative time (step S408).

If the above code is not representative of any one of the preselected commanding methods (NO, step S404), it is determined that an incorrect kind-of-deletion code is sent. In this case, the received control signal is written to the RAM 5, and an alert is generated (step S409). If desired, the above processing may be ended without such storage and alert.

Again, the above order of decision as to the kind of deletion is only illustrative and may be changed, as desired.

Figure 7:
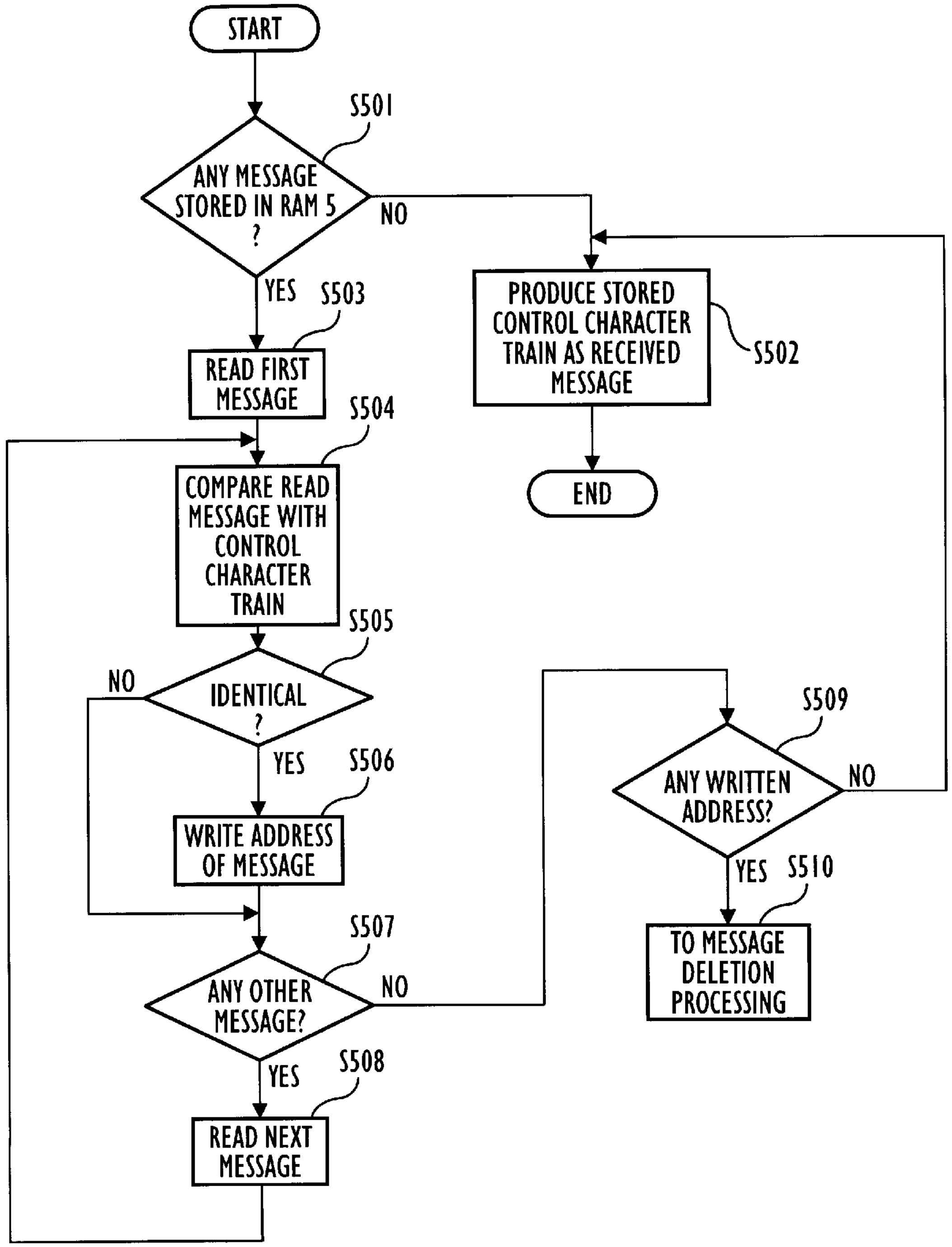
FIG. 7 is a flowchart demonstrating a message character mode operation available with the embodiment for the selection of a message to be deleted.

FIG. 7 shows how the embodiment selects a message to be deleted in response to the message character command. For the message character mode operation, the caller sends the same message as the message to be deleted. The message is sent together with the special code or with the special code common to all kinds of deletion and kind-of-deletion code representative of the message character command.

As shown in FIG. 7, whether or not the received message exists in the RAM 5 is determined (step S501). If the answer of the step S501 is NO, the control character train is dealt with as a received message, and an alert is generated (step S502).

If the answer of the step S501 is YES, the first message is read out (step S503). This may be done in order of address or of receipt time, as desired . Next, the message read out is compared with the control character train (step S504). If the message and control character train compare equal (YES, step S505), the address where the above message exists is stored (step S506). After the step S506 or if the answer of the step S505 is NO, whether or not another message exists in the RAM 5 is determined (step S507). If the answer of the step S507 is YES, the next message is read out (step S508) and compared with the control character train (step S504). Such a procedure is repeated with all the messages stored in the RAM 5.

After all the messages have been compared with the control character train (NO, step S507), whether or not any one of the messages is identical with the control character train, i.e., whether or not any address has been written to the RAM 5 is determined (step S509). If the answer of the step S509 is NO, the program returns to the step S502; if otherwise, the program starts the message deleting processing (step S510).

Figure 8:
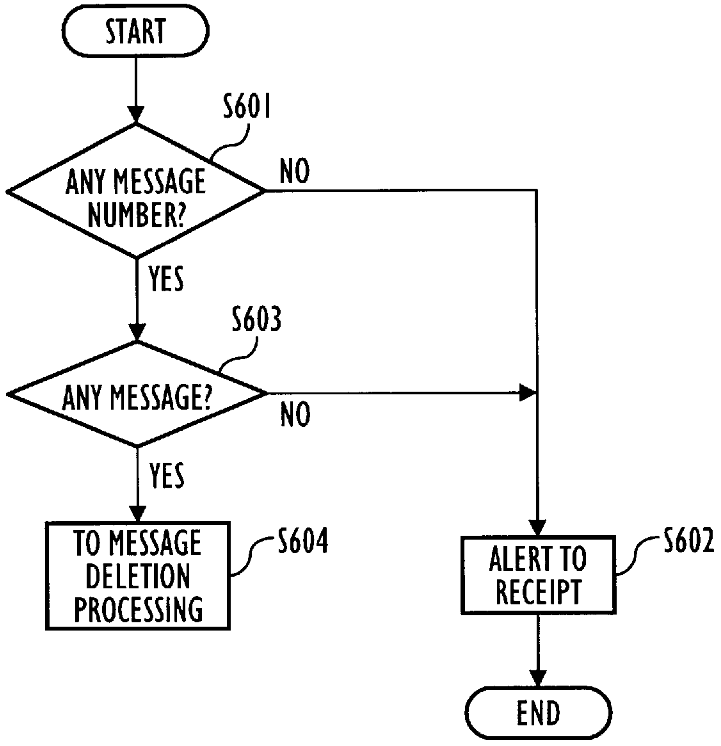
FIG. 8 is a flowchart demonstrating a message number mode operation also available with the embodiment for the above purpose.

FIG. 8 demonstrates a message number mode also available for selecting a message to be deleted. This mode operation is practicable only with a signal system which allows the transmitting station to identify a message number. The caller or transmitter sends a message number identical with the number of a message to be deleted as a control signal. Again, the message is sent together with the special code indicative of the message number mode or with the special code common to ail kinds of deletion and kind-of-deletion code representative of deletion based on message number.

As shown in FIG. 8, whether or not the control character train is representative of a message number is determined first (step S601). If the answer of the step S601 is NO, it is determined that the caller has sent incorrect information. In this case, only the usual message processing including the generation of an alert is executed (step S602). If the answer of the step S601 is YES, whether or not a message number identical with the message number represented by the control character train exists in the RAM 5 is determined (step S603). In this mode operation, all the message numbers corresponding to one represented by the control character train are selected. If the answer of the step S603 is YES, the program starts the message deleting processing (step S604). If the answer of the step S603 is NO, the usual message processing including the generation of an alert is executed.

Figure 9:
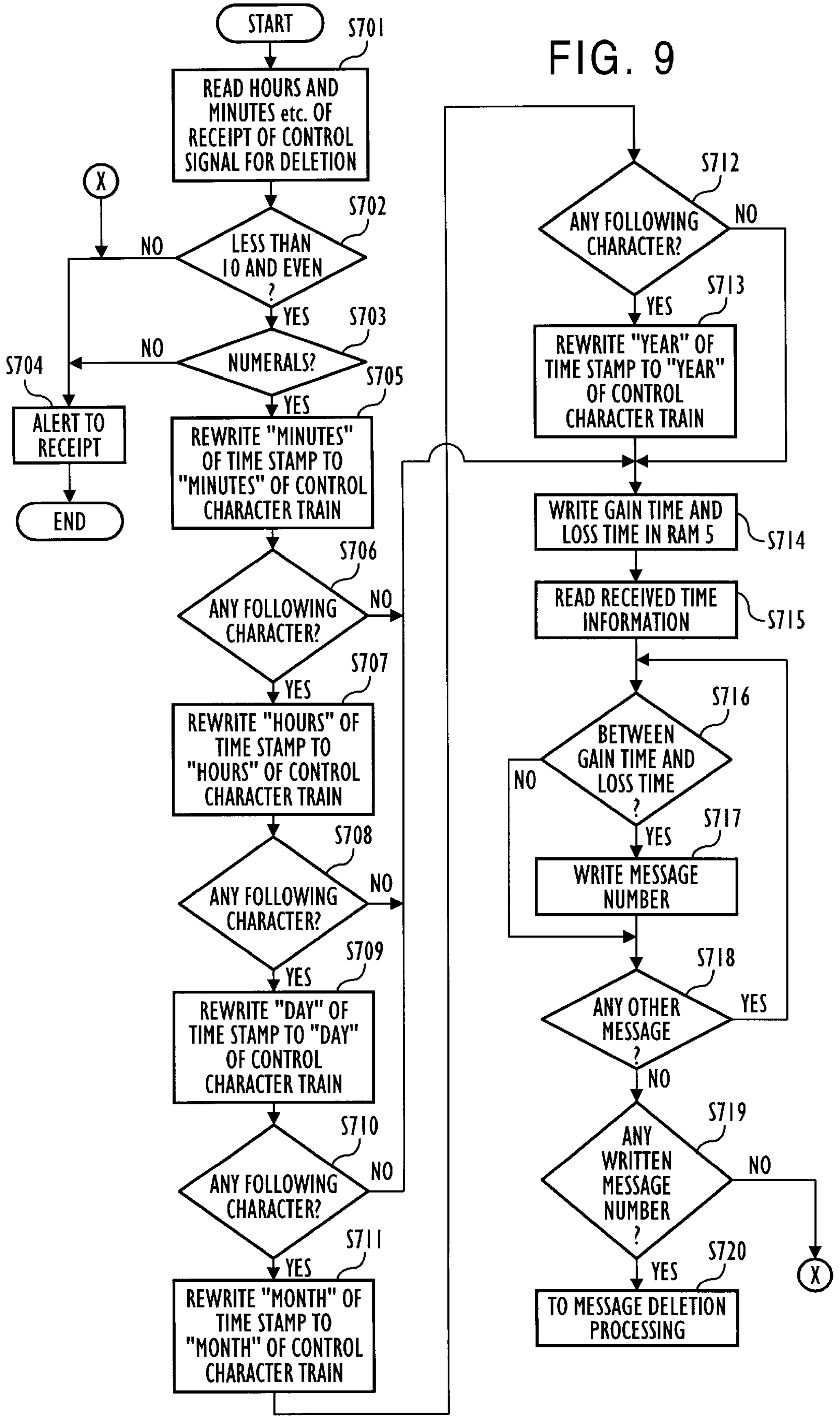
FIG. 9 is a flowchart demonstrating an absolute time mode operation also available with the embodiment.

FIG. 9 demonstrates the selection of a message to be deleted in the absolute time mode. This mode operation is practicable only with a radio pager having a time-piece function or a received message time stamp function. Briefly, when the caller sends the time of transmission of a message to be deleted as a control signal together with the special code, the radio pager detects the message received at that time and then deletes it. To transform an absolute time to a number, minutes, hours, day, month and year may each be represented by two figures in this order or in the reverse order by way of example. Alternatively, the signal receipt time may be used in order to omit hours, day, month and year.

As shown in FIG. 9, year, month, day, hours and minutes when the signal has been received are read out (step S701). Such information have been written to the RAM 5 in the form of, e.g., a time stamp when the address number has been received. Whether or not the number of characters constituting the control character train is less than ten inclusive and whether or not it is even is determined (step S702). If the answer of the step S702 is YES, whether or not the individual character of the control character train is representative of a numeral is determined (step S703). If the answer of the step S702 or that of the step S703 is NO, the usual message processing including the generation of an alert is executed (step S704).

If the answer of the step S702 and that of the step S703 are both YES, "minutes" included in the time stamp is rewritten to "minutes" which is the first character of the control character train (step S705). Next, whether or not a character following "minutes" exists in the control character train is determined (step S706). If the answer of the step S706 is YES, "hours" included in the time stamp is rewritten to "hours" of the control character train (step S707). In the same manner, "day", "month" and "year" of the time stamp are sequentially rewritten to "day", "month" and "year" of the control character train (steps S709, S711 and S713).

By the above procedure, the time stamp is transformed to the time at which the message to be deleted has been received. The time stamp makes it needless for the caller to send all the information in the form of a control character train. When the time stamp is not used, the control character train may be sent as it is, in which case the steps S705 through S713 are omissible.

After all the information of the control character train have been read, i.e., after the conversion of the character train representative of the time indicated by the caller, processing for providing the indicated time with margins is executed, as follows. This processing is derived from the fact that the time indicated by the caller is not always accurate, and the fact that a lag exists between the time of transmission and that of receipt. Specifically, the time several minutes earlier than the indicated time and the time several minutes later than the same are written to the RAM 5 as a gain time and a loss time, respectively (step S714).

Subsequently, the receipt time information (time stamp) of the stored message is read out of the RAM 5 (step S715). Whether or not the time read out of the RAM 5 lies between the gain time and the loss time is determined (step S716). If the answer of the step S716 is positive, the message number of the message is written to the RAM 5 (step S717). If a message number is not assigned to the message, then the address of the RAM 5 may be used.

If the answer of the step S716 is NO or after the step S717, whether or not any other message exists in the RAM 5 is determined (step S718). If the answer of the step S718 is YES, the receipt time information of the message is read out, and whether or not it lies between the above gain time and the loss time is determined. Such a procedure is repeated with all the messages existing in the RAM 5.

Thereafter, whether or not any message number has been written to the RAM 5 is determined (step S719). This is followed by the message deletion processing (step S720). If the message to be deleted does not exist in the RAM (No, step S719), the usual message processing including the generation of an alert is executed.

Figure 10:
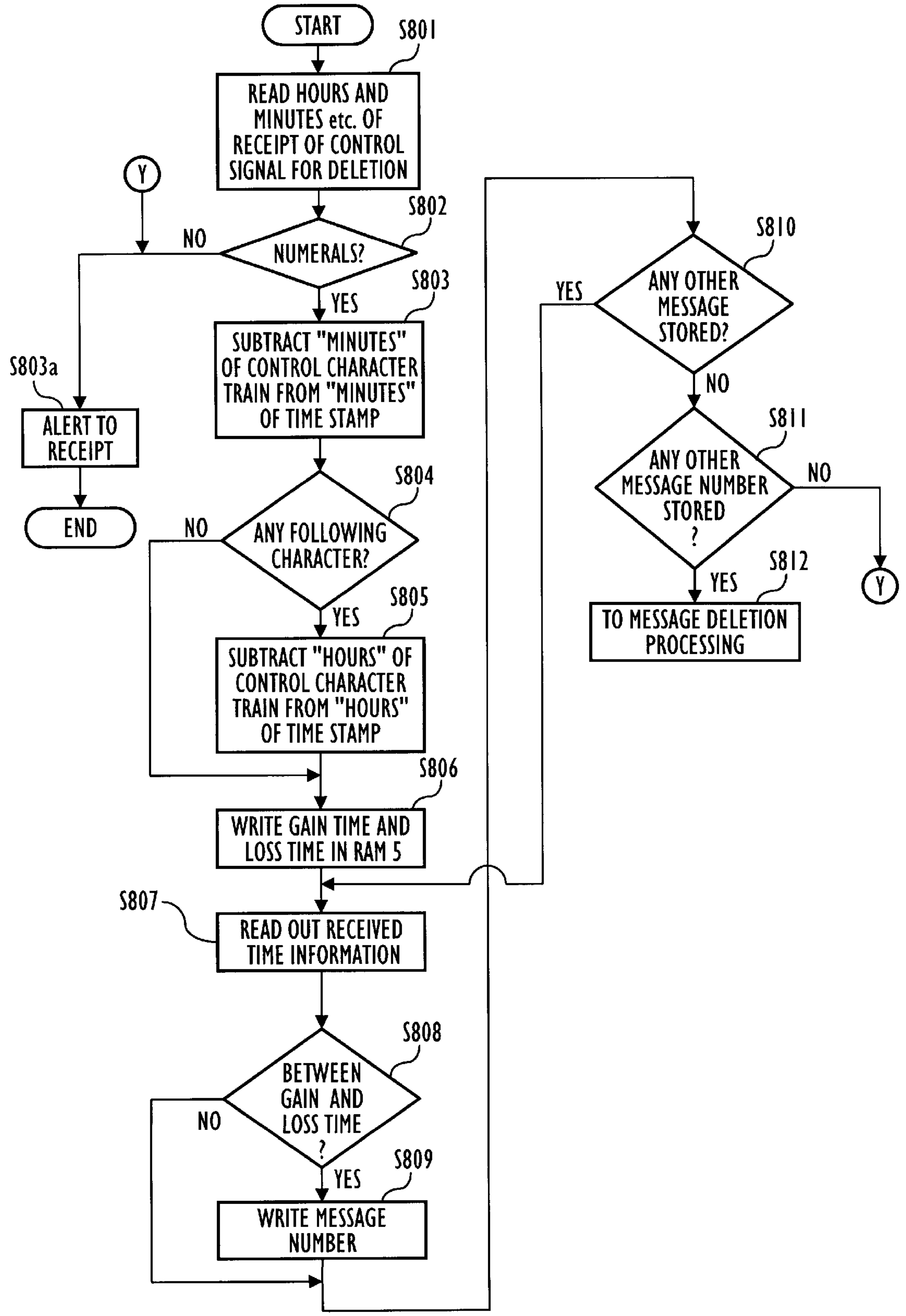
FIG. 10 is a flowchart demonstrating a relative time mode operation further available with the embodiment.

FIG. 10 demonstrates the relative time mode also available for the election of a message to be deleted specifically. This mode operation is also practicable only with a radio pager having a timepiece function or a receipt message time stamp function. When the caller sends the interval between the time of transmission of the message and the current time together with the special code as a control signal, the radio pager detects the message received during the above interval and deletes it.

To transform the interval or relative time to a number, minutes, hours, day, month and year may each be represented by two figures in this order or in the reverse order by way of example. Alternatively, the signal receipt time (time stamp) may be used in order to omit hours, day, month and year.

As shown in FIG. 10, the year, month, day, hours and minutes when the signal has been received are read out (step S801). Such information have been written to the RAM 5 in the form of, e.g., a time stamp when the address number has been received. Whether or not the individual character of the control character train is representative of a numeral is determined (step S802). If the control character train includes a character which is not a numeral (NO, step S802), then the usual message processing including the generation of an alert is executed (step S803*a*).

If the answer of the step S802 is YES, "minutes" leading the control character train is subtracted from "minutes" of the time stamp (step S803). If the control character train includes numerals representative of "hours" and so forth (YES, step S804), the above procedure is repeated with such numerals (step S805). In this manner, the time indicated by the caller is determined. As a result, the time stamp is rewrittem to the receipt time of the message to be deleted. The time stamp makes it needless for the caller to send all the information in the form of a control character train, thereby omitting the steps S803 through S805.

After all the information of the control character train have been read, i.e., after the time indicated by the caller has been determined, processing for providing the indicated time with margins is executed, as follows. This processing is derived from the fact that the time indicated by the caller is not always accurate, and the fact that a lag exists between the time of transmission and that of receipt. Specifically, the time several minutes earlier than the indicated time and the time several minutes later than the same are written to the RAM 5 as a gain time and a loss time, respectively (step S806).

Subsequently, the receipt time information (time stamp) of the stored message is read out of the RAM 5 (step S807). Whether or not the time read out of the RAM 5 lies between the gain time and the loss time is determined (step S808). If the answer of the step S808 is positive, the message number of the message is written to the RAM 5 (step S809). If a message number is not assigned to the message, then the address of the RAM 5 may be used.

If the answer of the step S808 is NO or after the step S809, whether or not any other message exists in the RAM 5 is determined (step S810). If the answer of the step S810 is YES, the receipt time information of the message is read out, and whether or not it lies between the above gain time and the lose time is determined. Such a procedure is repeated with all the messages existing in the RAM 5.

Thereafter, whether or not any message number has been written to the RAM 5 is determined (step S811). This is followed by the message deletion processing (step S812). If the message to be deleted does not exist in the RAM (NO, step S811), the usual message processing including the generation of an alert is executed.

Figure 11:
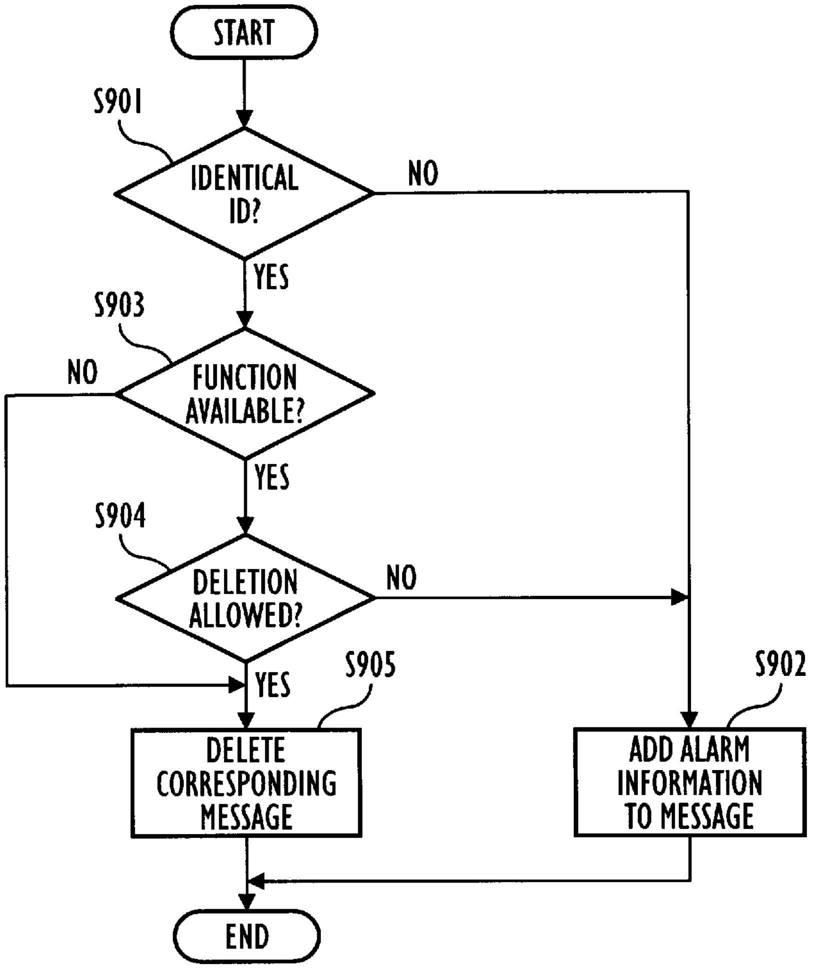
FIG. 11 is a flowchart showing how the embodiment deletes a message specifically.

The message deletion processing will be described with reference to FIG. 11. As shown, after the message to be deleted has been selected, the number of message numbers written to the RAM 5 is determined (step S901). If a plurality of messages to be deleted exist, they are stored with alarm information added thereto (step S902). The step S902 prevents the accidental deletion of a message selected, but different from one intended by the caller. In addition, the alarm information informs the user of the receipt of the deletion command.

If only one message is selected, it is determined to be the message to be deleted. When the pager has a selecting function as to the caller's deletion command (YES, step S903), whether or not the caller's deletion command should be executed unconditionally is determined. When the pager has such a function and if it is so set as not to allow the deletion to be executed (step S904), alarm information is added to the message, and the processing ends.

On the other hand, if the pager does not have the selecting function as to the caller's deletion command or if the pager having such a function is so set as to allow the deletion to be executed, the message selected is deleted from the RAM 5 (step S905).

In summary, it will be seen that the present invention provides a radio pager capable of allowing a caller sent an incorrect message to the pager by accident to delete it. The caller intending to delete the message can designate the message on the basis of the message itself, message number, absolute time or relative time, as desired. Further, when a time stamp function is used, it is possible to omit a part of the time or interval.

Various modifications will become possible for those skilled in the art after receiving the teachings of the present disclosure without departing from the scope thereof. For example, the message can be deleted on the basis of address information. Specifically, address information representative of the individual caller may be stored in a storage in order to delete a message whose address information is identical with that of the caller sent the special code.

What is claimed is:

1. A radio selective calling receiver comprising:

receiving means for receiving a paging signal sent from a caller;

storing means for storing a message included in the paging signal; and deleting means for deleting, when a special code commanding message deletion is included in the paging signal, a message stored in said storing means and corresponding to a message designated by a control signal following said special code, said control signal being one of characters of the message to be deleted, a message number of the message to be deleted, and a receipt time of the message to be deleted.

2. A radio selective calling receiver as claimed in claim 1, wherein said special code is indicative of a kind of the message deletion, said radio pager further comprising decision means for determining the kind of message deletion indicated by said special code.

3. A radio selective calling receiver as claimed in claim 1, wherein said deleting means comprises:

decision means for determining whether or not a plurality of messages to be deleted exist; and alarm information adding means for discontinuing, when a plurality of messages to be deleted exist, the message deletion and adding alarm information representative of receipt of a deletion command to said plurality of messages.

4. A radio selective calling receiver as claimed in claim 1, wherein said deleting means further comprises setting means for setting whether or not to execute message deletion beforehand.

5. A radio selective calling receiver as claimed in claim 4, wherein said deleting means further comprises alarm information adding means for discontinuing, when a plurality of massages to be deleted exist, the message deletion, and for adding alarm information, representative of receipt of a deletion command, to said plurality of messages, and wherein said alarm information adding means adds, when said setting means is so set as not to allow deletion to be executed, said alarm information.

6. A radio selective calling receiver as claimed in claim 1 further comprising timing means, wherein said storing means stores a time of receipt at which said receiving means receives the paging signal, and wherein said control signal designates the message to be deleted on the basis of said time of receipt.

7. A radio selective calling receiver as claimed in claim 6, further comprising searching means for searching messages received at and around said time of receipt in order to detect a message to be deleted.

8. A radio selective calling receiver as claimed in claim 1, wherein said storing means stores a message number included in the paging signal, and wherein said control signal designates a message to be deleted on the basis of said message number.

* * * * *